US012444845B2

(12) United States Patent
Cheng et al.

(10) Patent No.: US 12,444,845 B2
(45) Date of Patent: Oct. 14, 2025

(54) ANTENNA AND RADAR

(71) Applicant: SHENZHEN YINWANG INTELLIGENT TECHNOLOGIES CO., LTD., Shenzhen (CN)

(72) Inventors: Zhe Cheng, Xi'an (CN); Rui Yang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 156 days.

(21) Appl. No.: 17/894,399

(22) Filed: Aug. 24, 2022

(65) Prior Publication Data

US 2022/0416431 A1 Dec. 29, 2022

Related U.S. Application Data

(63) Continuation of application No. PCT/CN2021/077339, filed on Feb. 23, 2021.

(30) Foreign Application Priority Data

Feb. 25, 2020 (CN) ......................... 202010115641.7

(51) Int. Cl.
*H01Q 9/04* (2006.01)
*H01Q 1/32* (2006.01)
*H01Q 21/08* (2006.01)

(52) U.S. Cl.
CPC ........... *H01Q 9/045* (2013.01); *H01Q 1/3233* (2013.01); *H01Q 21/08* (2013.01)

(58) Field of Classification Search
CPC .... H01Q 1/3233; H01Q 9/045; H01Q 21/065; H01Q 21/08
See application file for complete search history.

(56) References Cited

U.S. PATENT DOCUMENTS

2002/0147534 A1 10/2002 Delcheccolo et al.
2009/0009399 A1 1/2009 Gaucher et al.
(Continued)

FOREIGN PATENT DOCUMENTS

CN 201590486 U 9/2010
CN 203674388 U 6/2014
(Continued)

OTHER PUBLICATIONS

M. S. R. Mohd Shah, M. Z. A. Abdul Aziz, M. K., and M. K. A Rahim, 'Dual Linearly Polarized Microstrip Array Antenna', Trends in Telecommunications Technologies. InTech, Mar. 1, 2010. doi: 10.5772/8468. (Year: 2010).*
(Continued)

*Primary Examiner* — Dameon E Levi
*Assistant Examiner* — Leah Rosenberg
(74) *Attorney, Agent, or Firm* — Fish & Richardson P.C.

(57) ABSTRACT

Embodiments of this application disclose an antenna. The antenna may be applied to the field of automatic driving and the field of vehicle-to-everything, and the antenna includes a first radiating element and a first feed line. A first end of the first feed line is connected to the first radiating element. The first radiating element and the first feed line are arranged on a same surface of a dielectric substrate. The first feed line includes a first feed line segment, and an acute angle between the first feed line segment and a current direction of the first radiating element is greater than or equal to 20 degrees, and is less than or equal to 70 degrees. A feeding manner of the antenna is parallel feeding.

19 Claims, 7 Drawing Sheets

(56) References Cited

U.S. PATENT DOCUMENTS

| | | | | |
|---|---|---|---|---|
| 2009/0256777 A1* | 10/2009 | Nagai | H01Q 9/0407 343/893 | |
| 2016/0359238 A1* | 12/2016 | Okunaga | H01P 5/12 | |
| 2023/0361462 A1* | 11/2023 | Hwang | H01Q 1/523 | |

FOREIGN PATENT DOCUMENTS

| | | | |
|---|---|---|---|
| CN | 204793183 | U | 11/2015 |
| CN | 106972244 | A | 7/2017 |
| CN | 107026322 | A | 8/2017 |
| CN | 107196049 | A | 9/2017 |
| CN | 206574843 | U | 10/2017 |
| CN | 108075225 | A | 5/2018 |
| CN | 208062245 | U | 11/2018 |
| CN | 109244681 | A | 1/2019 |
| CN | 109428175 | A | 3/2019 |
| CN | 208596784 | U | 3/2019 |
| KR | 20100113347 | A | 10/2010 |
| WO | 2018060360 | A1 | 4/2018 |

OTHER PUBLICATIONS

Shah et al., "Dual Linearly Polarized Microstrip Array Antenna," Trends in Telecommunications Technologies, Mar. 1, 2010, 24 pages.

Extended European Search Report in European Appln No. 21761311.6, dated Jun. 5, 2023, 12 pages.

International Search Report and Written Opinion in International Appln. No. PCT/CN2021/077339, mailed on May 13, 2021, 18 pages (with English translation).

* cited by examiner

ANTENNA AND RADAR

CROSS-REFERENCE TO RELATED APPLICATIONS

This application is a continuation of International Application No. PCT/CN2021/077339, filed on Feb. 23, 2021, which claims priority to Chinese Patent Application No. 202010115641.7, filed on Feb. 25, 2020. The disclosures of the aforementioned applications are hereby incorporated by reference in their entireties.

TECHNICAL FIELD

This application relates to the detection field, and in particular, to an antenna and a radar.

BACKGROUND

With economic development, vehicles have become the most important means of transportation for people. As a sharp increase in a quantity of the vehicles causes frequent traffic accidents, personnel and economic loss is huge. Therefore, it is necessary to sense a surrounding obstacle by disposing a sensor on a vehicle. An automotive radar has an obvious effect in reducing the traffic accidents. As a key component in a wireless electronic device, an antenna significantly affects performance indicators of an entire radar system, and is especially widely applied to the field of automatic driving.

The antenna is one of the most important front-end passive components of a communication device. Thus the antenna plays an important role for performance of a communication product. Currently, a feed network of array antennas may generally employ microstrips, waveguides, or substrate-integrated waveguides. The microstrip feed network may meet an equal-amplitude in-phase requirement through a design of a parallel-fed structure.

In the conventional technology, an antenna array of a multilayer parallel-fed form is used, a bottom layer of the antenna array is a feed network, and an antenna unit is fed in a parallel-fed manner. Therefore, antennas of the antenna array have a wide bandwidth. However, because the antennas in the foregoing design use a multilayer structure, processing difficulty and processing costs of the antenna array are very high.

SUMMARY

Embodiments of this application provide an antenna and a radar, to reduce antenna processing difficulty and costs.

According to a first aspect, this application provides an antenna, including a first radiating element and a first feed line. A first end of the first feed line is connected to the first radiating element. The first radiating element and the first feed line are arranged on a same surface of a dielectric substrate. The first feed line includes a first feed line segment, and an acute angle between the first feed line segment and a current direction of the first radiating element is greater than or equal to 20 degrees, and is less than or equal to 70 degrees. A feeding manner of the antenna is parallel feeding.

It should be noted that, in this embodiment, the first radiating element may include a feed point, and the feed point is a feed connection point between a feed network and the first radiating element. A perpendicular line of the first radiating element on a tangent plane of the feed point may be understood as the current direction of the first radiating element in this embodiment. It should be noted that, in this embodiment, during operation, a current on the first radiating element may include a plurality of current directions, and there may be a slight difference between the plurality of current directions. In this embodiment, the current direction on the first radiating element may represent current directions of most currents on the first radiating element.

In this embodiment of this application, impact of radiation of the feed line segment on cross polarization of the radiating element is less than impact of radiation of the feed line on the cross polarization of the radiating element when the feed line is parallel to the current direction of the radiating element. Similarly, impact of the radiation of the at least one feed line segment on co-polarization of the radiating element is less than impact of the radiation of the feed line on the co-polarization of the radiating element when the feed line is perpendicular to the current direction of the radiating element. In this way, when the feed line and the radiating element are located at a same layer, impact of radiation of the feed line on the radiating element is reduced. In addition, the feed line and the radiating element are disposed at a same layer. This reduces material costs and processing difficulty.

In an optional design of the first aspect, a difference between a length of the first feed line segment and a preset wavelength is less than a preset value, and the preset wavelength is one half of a dielectric wavelength of the dielectric substrate.

In this embodiment, phases of feed line segments of a half-wavelength (one half of the dielectric wavelength) or close to the half-wavelength are opposite in a far field, so that some radiant energy counteracts each other. This reduces impact of the radiation of the feed line on co-polarization and cross polarization of an antenna pattern.

In an optional design of the first aspect, the first feed line further includes a second feed line segment. A first end of the first feed line segment is connected to a first end of the second feed line segment, and an included angle between the first feed line segment and the second feed line segment is greater than or equal to 70 degrees, and is less than or equal to 135 degrees.

In this embodiment of this application, when the feed line is parallel to the current direction of the radiating element, the radiation of the feed line and the cross polarization of the radiating element superimpose each other in the far field. This causes an elevation of a side lobe of the antenna pattern. When the feed line is perpendicular to the current direction of the radiating element, the radiation of the feed line and the co-polarization of the radiating element superimpose and affect each other in the far field. This causes a distortion of the antenna pattern. When the included angle between the feed line and the current direction of the radiating element is greater than or equal to 20 degrees and less than or equal to 70 degrees (for example, the included angle is 45 degrees), and the feed line is a bent line (the included angle between the first feed line segment 203 and the second feed line segment 204 is greater than or equal to 70 degrees and less than or equal to 135 degrees, for example, 90 degrees), a phase of the first feed line segment 203 and a phase of the second feed line segment 204 are opposite in the far field, so that some radiant energy counteracts each other. In this case, the impact of the radiation of the feed line on the co-polarization and the cross polarization of the antenna pattern is further reduced.

In an optional design of the first aspect, a second end of the first feed line segment is connected to the first radiating element.

In a possible design of the first aspect, the antenna further includes:

a first power splitter, a second radiating element, and a second feed line, where the first end of the second feed line is connected to the second radiating element, and is configured to feed the second radiating element. The first power splitter, the second radiating element, the second feed line, and the first radiating element are arranged on a same surface of the dielectric substrate. A first end of the first power splitter is separately connected to a second end of the first feed line and a second end of the second feed line. The second radioing element and the first radiating element are symmetrically arranged on the dielectric substrate relative to the first power splitter. The second feed line and the first feed line are symmetrically arranged on the dielectric substrate relative to the first power splitter.

In an optional design of the first aspect, the antenna further includes a second power splitter and a third feed line. The second power splitter, the third feed line, and the first radiating element are arranged on a same surface of the dielectric substrate. The second power splitter and the first power splitter are centrosymmetric on the dielectric substrate relative to a center point of the second radiating element, and the other end of the first power splitter is connected to an end of the second power splitter through the third feed line. The third feed line includes at least one third feed line segment, and an acute angle between each third feed line segment and the current direction of the first radiating element is greater than or equal to 20 degrees, and is less than or equal to 70 degrees. According to the foregoing design, space occupation of an antenna array can be reduced, and space utilization of the antenna array is improved.

In an optional design of the first aspect, a difference between a length of each third feed line segment and the preset wavelength is less than the preset value, and the preset wavelength is one half of the dielectric wavelength of the dielectric substrate.

In an optional design of the first aspect, the first end of the first power splitter and a second end of the second power splitter are in a same direction, and a second end of the first power splitter and a first end of the second power splitter are in a same direction. According to the foregoing design, space occupation of an antenna array can be reduced, and space utilization of the antenna array is improved.

In an optional design of the first aspect, an interval between the first radiating element and the second radiating element is greater than or equal to one half of the dielectric wavelength of the dielectric substrate, and is less than or equal to the dielectric wavelength of the dielectric substrate.

In an optional design of the first aspect, an operating frequency of the antenna is greater than 60 GHZ. In a high-frequency scenario, because the dielectric substrate is relatively thick relative to the dielectric wavelength of the dielectric substrate, when a parallel-fed network and the radiating element are disposed at a same layer, greater impact is caused on a pattern of the radiating element. When this embodiment is applied to the high-frequency scenario, impact caused by the parallel-fed network on the pattern of the radiating element can be greatly reduced.

In an optional design of the first aspect, a ratio of the dielectric wavelength to a thickness of the dielectric substrate is less than 20.

In an optional design of the first aspect, the antenna further includes:

a reflection panel, where the reflection panel and the feed line are disposed on opposite surfaces of the dielectric substrate.

According to a second aspect, this application provides a radar, including the antenna according to any one of the first aspect or the optional designs of the first aspect. The radar receives and sends a signal through the antenna.

In an optional design of the second aspect, the radar is a vehicle-mounted radar.

Embodiments of this application provide an antenna, including a first radiating element and a first feed line. A first end of the first feed line is connected to the first radiating element. The first radiating element and the first feed line are arranged on a same surface of a dielectric substrate. The first feed line includes a first feed line segment, and an acute angle between the first feed line segment and a current direction of the first radiating element is greater than or equal to 20 degrees, and is less than or equal to 70 degrees. A feeding manner of the antenna is parallel feeding. In this application, when impact of the feed line on a pattern of the radiating element is reduced, a feed network and the radiating element are disposed at a same layer of the dielectric substrate. This reduces processing difficulty and costs of a microstrip antenna.

DESCRIPTION OF EMBODIMENTS

Figure 1A:
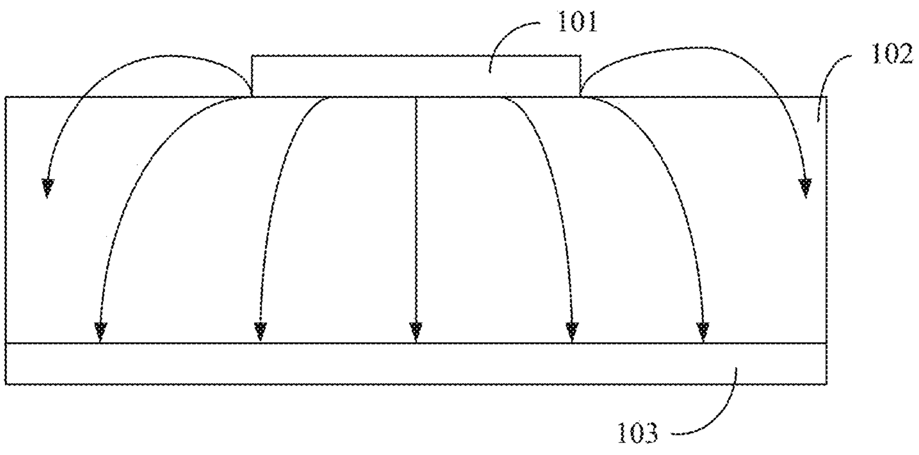
FIG. 1*a* is a schematic diagram of radiation of a feed line.

Embodiments of this application provide a microstrip antenna, to reduce processing difficulty and costs of the microstrip antenna.

The following describes embodiments of this application with reference to the accompanying drawings. A person of ordinary skill in the art may learn that, with technology development and emergence of a new scenario, the technical solutions provided in embodiments of this application are also applicable to a similar technical problem.

In the specification, claims, and accompanying drawings of this application, terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

With economic development, vehicles have become the most important means of transportation for people. As a sharp increase in a quantity of the vehicles causes frequent traffic accidents, personnel and economic loss is huge. However, an automotive radar has an obvious effect in reducing the traffic accidents. As a key component in a wireless electronic device, an antenna significantly affects a performance indicator of an entire radar system.

In the conventional technology, an antenna array of a multilayer parallel-fed form is used, a bottom layer of the antenna array is a feed network, and an antenna unit is fed in a parallel-fed manner. Therefore, antennas of the antenna array have a wide bandwidth. However, because the antennas in the foregoing design use a multilayer structure, processing difficulty and processing costs of the antenna array are very high. However, an antenna array of a single-layer pure parallel-fed form is difficult to implement in a millimeter wave due to a radiation problem of a feed line. Therefore, the antenna array of the pure parallel-fed form uses a multilayer form, that is, the feed network and the antenna unit are separately located at an upper layer and a lower layer. However, this increases the processing difficulty and costs.

Specifically, when a feed line of a microstrip antenna transmits an electromagnetic wave, a part of the electromagnetic wave is in air, and a part of the electromagnetic wave is in a dielectric substrate. In a low frequency band (for example, below 40 GHz), a ratio of a thickness of a commonly used dielectric to a wavelength is about 1/20 to 1/50. In this case, most of the electromagnetic wave is bound between the feed line and conductor ground, and energy of the electromagnetic wave radiated to free space is low. However, in a high frequency band (for example, above 60 GHz), a ratio of a thickness of the dielectric substrate to the wavelength is approximately greater than 1/20. In this case, a small part of the electromagnetic wave is radiated to free space through the feed line, and the small part of the electromagnetic wave radiated to the free space greatly affects a pattern of a radiating element.

FIG. 1*a* is a schematic diagram of radiation of a feed line. As shown in FIG. 1*a*, the feed line 101 is disposed on one side of a dielectric substrate 102, and a reflection panel 103 is disposed on the other side of the dielectric substrate 102. When the dielectric substrate 102 is thick, electromagnetic wave radiation of the feed line 101 may reach the reflection panel 103 through the dielectric substrate 102. However, in a high frequency band (for example, above 60 GHz), a ratio of a thickness of the dielectric substrate 102 to a wavelength is approximately greater than 1/20. In this case, a small part of the electromagnetic wave is radiated to free space through the feed line 101, and the small part of the electromagnetic wave radiated to the free space greatly affects a pattern of a radiating element.

To resolve the foregoing problem, this application provides a microstrip antenna.

Figure 1B:
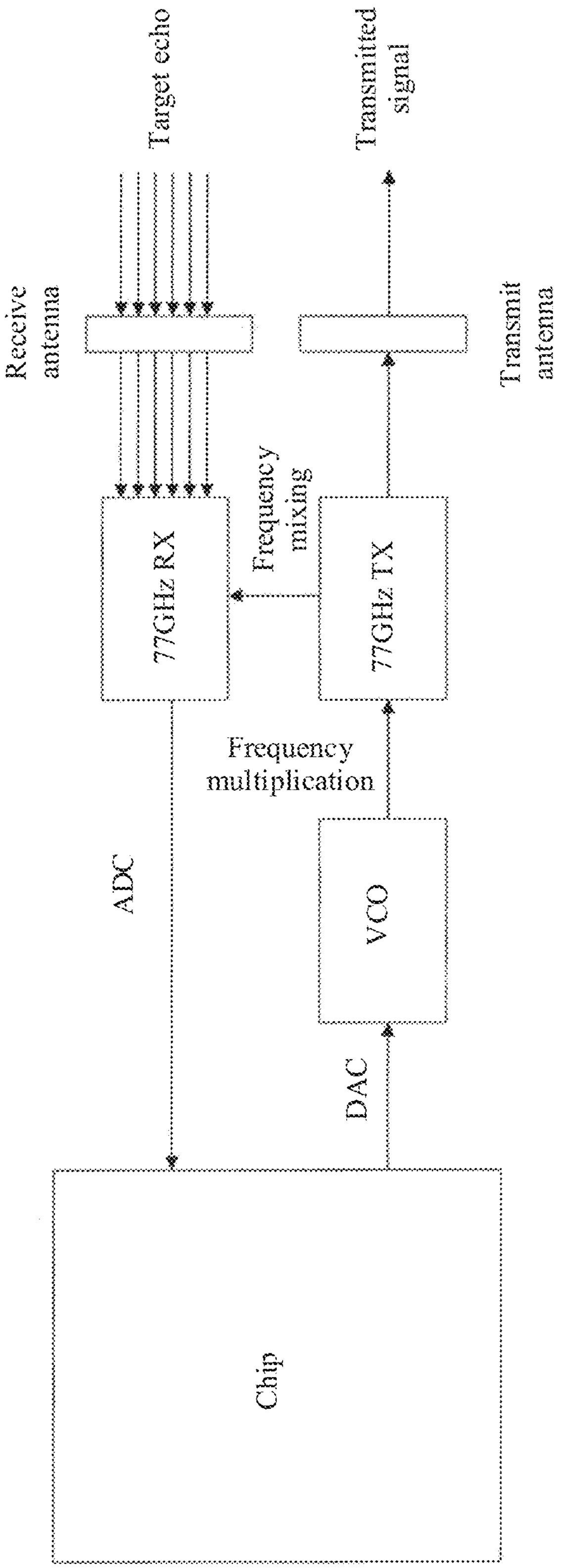
FIG. 1*b* is a schematic diagram of an architecture of a scenario according to an embodiment of this application.

First, a schematic diagram of an architecture of an optional application scenario in an embodiment of this application is described, FIG. 1*b* is a schematic diagram of an architecture of a scenario according to an embodiment of this application. As shown in FIG. 1*b*, this embodiment of this application may be applied to a vehicle-mounted radar system. During operation, an analog-to-digital converter (analog-to-digital converter, DAC) wave generated by a chip is sent to a voltage-controlled oscillator (voltage-controlled oscillator, VCO) to generate a linear frequency-modulated continuous wave. A signal (for example, 77 GHz) generated through frequency multiplication is transmitted through a microstrip antenna (a transmit antenna). A target echo is received through a microstrip antenna (a receive antenna) and frequency mixing is performed on the target echo and a transmit signal to generate an intermediate frequency signal. The intermediate frequency signal is sampled and processed through the chip.

This application may be applied to the vehicle-mounted radar system, and the vehicle-mounted radar system may be used for, but is not limited to, anti-collision, imaging, adaptive cruise control, blind spot monitoring, and the like.

Figure 2:
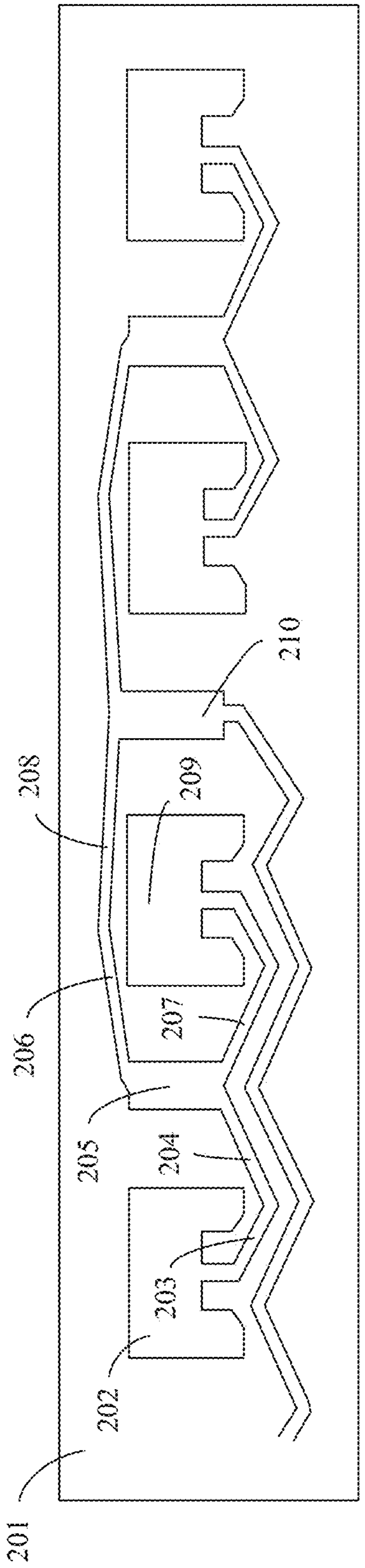
FIG. 2 is a schematic diagram of an embodiment of a microstrip antenna according to an embodiment of this application.

FIG. 2 is a schematic diagram of an embodiment of an antenna according to an embodiment of this application. As shown in FIG. 2, the antenna provided in this embodiment of this application includes a first radiating element 202 and a first feed line. A first end of the first feed line is connected to the first radiating element. The first radiating element 202 and the first feed line are arranged on a same surface of a dielectric substrate 201. The first feed line includes a first feed line segment, and an acute angle between the first feed line segment and a current direction of the first radiating element 202 is greater than or equal to 20 degrees, and is less than or equal to 70 degrees.

It should be noted that the first radiating element may alternatively include the radiating element itself and a small segment of a lead (for example, a small vertical downward segment of a feed lead that is directly connected to the first radiating element 202 and that is shown in FIG. 2) connected to the first radiating element. That the first feed line is connected to the first radiating element may mean that the first feed line is connected to the lead directly connected to the first radiating element.

In a possible design, the first radiating element 202 is one of a plurality of radiating elements included in the antenna.

In a possible design, a feed network includes the first feed line (including the first feed line segment 203). In other words, the first feed line is a segment of a feed line included in the feed network. A first end of the first feed line 203 is connected to the first radiating element 202, and is configured to feed the first radiating element 202. In other words, the first feed line 203 is a feed line segment directly connected to the first radiating element 202.

Figure 3A:
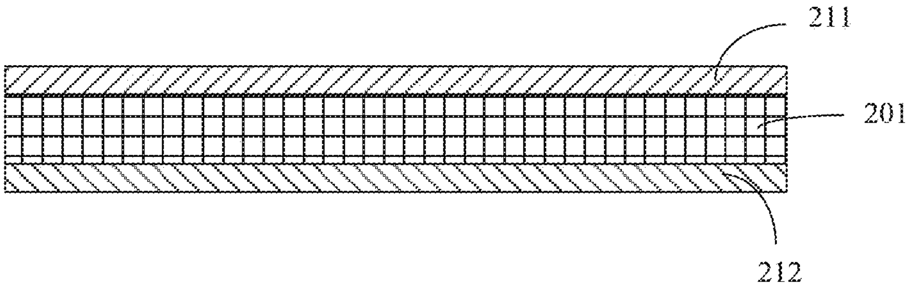
FIG. 3*a*, FIG. 3*b*, and FIG. 3*c* are each a schematic diagram of a structure of a microstrip antenna according to an embodiment of this application.

In a possible design, the first radiating element 202 and the first feed line are arranged on a same surface of the dielectric substrate 201. FIG. 3*a* is a schematic diagram of a structure of a microstrip antenna according to an embodiment of this application. As shown in FIG. 3*a*, the microstrip antenna includes the dielectric substrate 201, and the dielectric substrate includes two opposite surfaces. 211 (the feed network and the radiating element) is disposed on one surface, and an antenna formed by a reflection panel 212 may be disposed on the other surface. The reflection panel 212 may also be expressed as conductor ground or a metal floor. The reflection panel 212 is a conductor ground plane (English: ground plane), and the dielectric substrate 201 enables an open circuit between the radiating element and the reflection panel 212.

In a possible design, the first feed line includes a first feed line segment, and an acute angle between the first feed line segment and a current direction of the first radiating element is greater than or equal to 20 degrees, and is less than or equal to 70 degrees.

In a possible design, the first feed line includes at least one feed line segment, the first feed line segment is one of the at least one feed line segment, and the acute angle between each of the at least one feed line segment and the current direction of the first radiating element is greater than or equal to 20 degrees, and is less than or equal to 70 degrees.

When the radiating element and the feed network are at a same layer, radiation of the feed line has great impact on a pattern and bandwidth of the radiating element. This causes deformation of the pattern and narrowing of the bandwidth. Specifically, when the feed line is parallel to the current direction of the radiating element, the radiation of the feed line and cross polarization of the radiating element superimpose each other in a far field. This causes an elevation of a side lobe of an antenna pattern. When the feed line is perpendicular to the current direction of the radiating element, the radiation of the feed line and the co-polarization of the radiating element superimpose and affect each other in the far field. This causes a distortion of the antenna pattern. In this embodiment of this application, the first feed line includes at least one feed line segment, and the acute angle between the first feed line segment and the current direction of the first radiating element is greater than or equal to 20 degrees and less than or equal to 70 degrees. In other words, the included angle between the at least one feed line segment and the current direction of the radiating element is around 45 degrees. The impact of the radiation on the radiating element may be decomposed into two directions: cross polarization and co-polarization. In this embodiment of this application, the impact of the radiation of the at least one feed line segment on the cross polarization of the radiating element is less than the impact of the radiation of the feed line on the cross polarization of the radiating element when the feed line is parallel to the current direction of the radiating element. Similarly, the impact of the radiation of the at least one feed line segment on the co-polarization of the radiating element is less than the impact of the radiation of the feed line on the co-polarization of the radiating element when the feed line is perpendicular to the current direction of the radiating element. In this way, when the feed line and the radiating element are located at a same layer, impact of radiation of the feed line on the radiating element is reduced. In addition, the feed line and the radiating element are disposed at a same layer. This reduces material costs and processing difficulty.

It should be noted that, in this embodiment, the first radiating element may include a feed point, and the feed point is a feed connection point between a feed network and the first radiating element. A perpendicular line of the first radiating element on a tangent plane of the feed point may be understood as the current direction of the first radiating element in this embodiment.

Figure 3B:
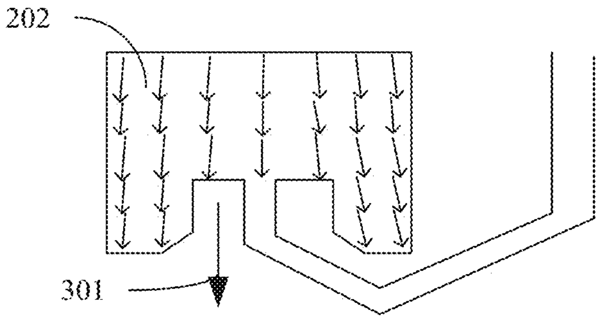

It should be noted that, during operation, a current on the first radiating element may include a plurality of current directions, and there may be a slight difference between the plurality of current directions. In this embodiment, the current direction on the first radiating element may represent an approximate current direction on the first radiating element. Specifically, FIG. 3*b* is a schematic diagram of a structure of a radiating element. As shown in FIG. 3*b*, during operation, direction distribution of currents on the first radiating element 202 may be as shown in FIG. 3*b*. Although the directions of the currents on the first radiating elements are not strictly the same, there is a direction 301 that can roughly represent overall current distribution. It should be noted that the current direction 301 on the first radiating element shown in FIG. 3*b* is merely an example. In actual application, a direction different from the current direction 301 shown in FIG. 3*b* may be selected. This is not limited herein.

Figure 3C:
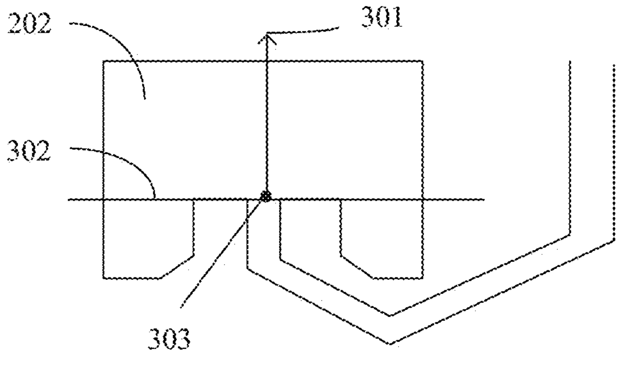

FIG. 3*c* is a schematic diagram of a structure of a radiating element. As shown in FIG. 3*c*, the first radiating element 202 may include a feed point 303, and a direction of a perpendicular line of the first radiating element 202 on a tangent plane 302 of the feed point 303 may be considered as the current direction 301 of the first radiating element.

It should be noted that, in this embodiment, when there is a depression or a protrusion on the surface of the radiating element, a current direction of the radiating element may differ greatly from the current direction of the first radiating element. The foregoing special case is not considered in this embodiment, and only the approximate current direction of the first radiating element when the first radiating element works may be indicated.

The antenna in this embodiment of this application may be a microstrip antenna. A feeding manner of the microstrip antenna is parallel feeding. The microstrip antenna may include a plurality of radiating elements that are arranged along an array. A quantity of the radiating elements of the microstrip antenna may be 2N, where N is greater than or equal to 2. The radiating element is an apparatus for receiving and sending an electromagnetic signal, and is configured to receive a high-frequency electromagnetic wave from space or transmit a high-frequency electromagnetic wave from a chip. The microstrip antenna further includes a feed network. The feed network is connected to a plurality of radiating arrays included in the microstrip antenna, and is configured to feed the plurality of radiating elements. It should be noted that in this embodiment of this application, feeding may also be understood as signal transmission. The feed network includes a feed line and a power splitter. One end of the feed network is connected to a chip, and the other end includes a plurality of feed line branches. Each feed line branch is connected to one radiating element. The feed network performs power allocation on an input signal of the chip through the power splitter, and transmits a signal to the plurality of radiating elements in parallel through the plurality of feed line branches, so as to allocate received energy to the radiating elements in an equal-amplitude same-phase mode, or combine signals received by the plurality of radiating elements, and transmit the signals to the chip through the feed line. The radiating elements are basic structural units of the microstrip antenna, and can effectively radiate or receive electromagnetic waves. The feed line is a transmission line (English: transmission line) that connects the radiating element and a radio transceiver (for example, the chip).

The microstrip antenna shown in FIG. 2 is an antenna array including four radiating elements, including four radiating elements that are arranged at equal intervals along a straight line, three T-type power splitters, and a teed line. The three T-type power splitters are located between two adjacent radiating elements of the four radiating elements. The T-type power splitter at the center is placed in a forward direction, and the T-type power splitters on left and right sides are placed in a reverse direction. The T-type power splitters and the feed line form a feed network. It should be noted that the foregoing directional descriptions of "placed in a forward direction" and "placed in a reverse direction" are merely intended to indicate that a direction of the power splitter at the center is different from a direction of the power splitters on the left and right sides, and do not constitute an absolute limitation on the directions of the power splitters. One end of the feed network is connected to four radiating elements, and the other end is a general input port, and is connected to a signal transceiver unit such as the chip, to form an entire antenna array.

It should be noted that the at least one feed line segment may be one or more feed line segments. When there are a plurality of feed line segments whose acute angles with the current direction of the first radiating element are greater than or equal to 20 degrees and less than or equal to 70 degrees, the acute angles between the feed line segments and the current direction of the first radiating element may be the same or different. In actual application, the acute angle may be designed based on an arrangement of the antenna array. This is not limited herein.

In a possible design, a difference between a length of each feed line segment and a preset wavelength is less than a preset value. The preset wavelength is one half of a dielectric wavelength of the dielectric substrate, and the preset value may be but is not limited to a quarter of the dielectric wavelength. In this embodiment, phases of feed line segments of a half-wavelength (one half of the dielectric wavelength) or close to the half-wavelength are opposite in a far field, so that some radiant energy counteracts each other. This reduces impact of the radiation of the feed line on co-polarization and cross polarization of an antenna pattern.

The at least one feed line segment includes the first feed line segment 203 and a second feed line segment 204. A first end of the first feed line segment 203 is connected to a first end of the second feed line segment 204. An included angle between the first feed line segment 203 and the second feed line segment 204 is greater than or equal to 70 degrees, and is less than or equal to 135 degrees.

When the feed line is parallel to the current direction of the radiating element, the radiation of the feed line and the cross polarization of the radiating element superimpose each other in the far field. This causes an elevation of a side lobe of the antenna pattern. When the feed line is perpendicular to the current direction of the radiating element, the radiation of the feed line and the co-polarization of the radiating element superimpose and affect each other in the far field. This causes a distortion of the antenna pattern. When the included angle between the feed line and the current direction of the radiating element is greater than or equal to 20 degrees and less than or equal to 70 degrees (for example, the included angle is 45 degrees), and the feed line is a bent line (the included angle between the first feed line segment 203 and the second feed line segment 204 is greater than or equal to 70 degrees and less than or equal to 135 degrees, for example, 90 degrees), a phase of the first feed line segment 203 and a phase of the second feed line segment 204 are opposite in the far field, so that some radiant energy counteracts each other. In this case, the impact of the radiation of the feed line on the co-polarization and the cross polarization of the antenna pattern is further reduced.

In an embodiment, a structure of the at least one feed line segment may be the same as that shown in FIG. 2. The feed line connected to the first radiating element 202 includes feed line segments (the first feed line segment 203 and the second feed line segment 204) connected to each other, and the included angle between the feed line segments may be greater than or equal to 70 degrees and less than or equal to 135 degrees.

Figure 4:
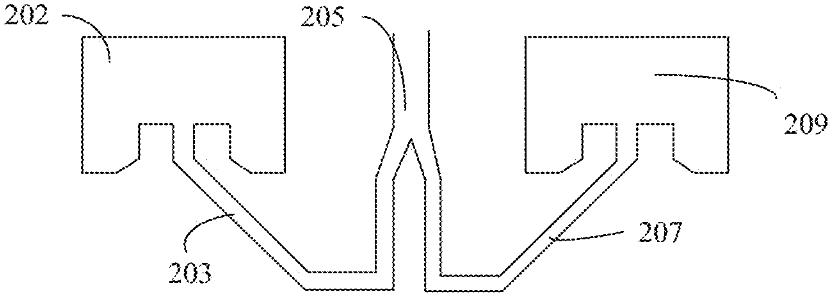
FIG. 4 is a schematic diagram of a structure of a microstrip antenna according to an embodiment of this application.

In an embodiment, a structure of the at least one feed line segment may be the same as that shown in FIG. 4. An included angle between the first feed line segment 203 connected to the first radiating element 202 and a current direction of the radiating element 202 is greater than or equal to 20 degrees, and is less than or equal to 70 degrees (for example, an included angle of 45 degrees). According to the foregoing design, space occupation of an antenna array can be reduced, and space utilization of the antenna array is improved.

Figure 5:
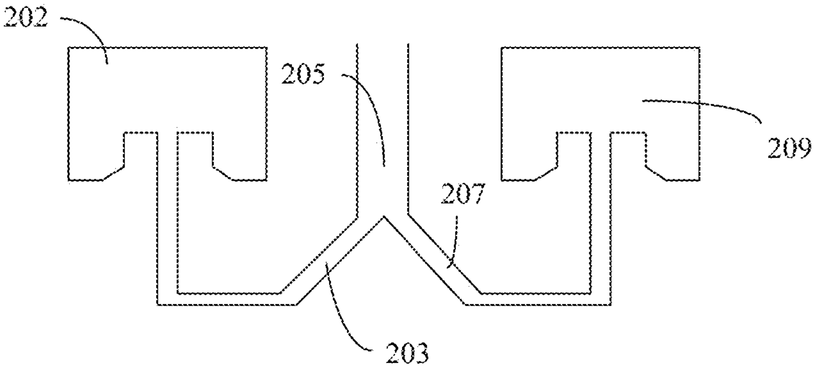
FIG. 5 is a schematic diagram of a structure of a microstrip antenna according to an embodiment of this application.

In an embodiment, a structure of the at least one feed line segment may be the same as that shown in FIG. 5. An included angle between the feed line connected to the first radiating element 202 and a current direction of a radiating element is equal to 90 degrees, and the first feed line segment 203 whose included angle with the current direction of the radiating element is greater than or equal to 20 degrees and less than or equal to 70 degrees is not directly connected to the radiating element.

Figure 6:
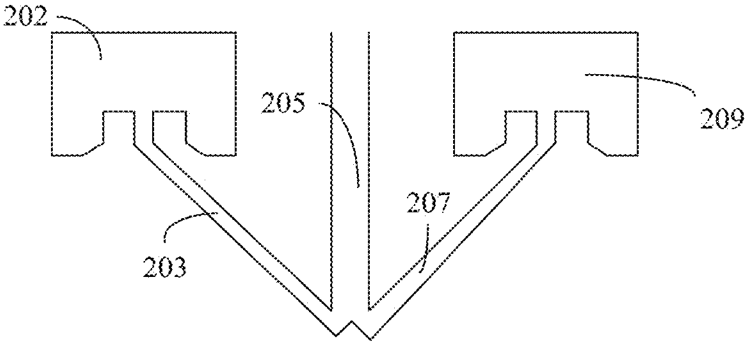
FIG. 6 is a schematic diagram of a structure of a microstrip antenna according to an embodiment of this application.

In an embodiment, a structure of the at least one feed line segment may be the same as that shown in FIG. 6. An included angle between the first feed line segment 203 connected to the first radiating element 202 and a current direction of the radiating element 202 is greater than or equal to 20 degrees, and is less than or equal to 70 degrees.

As shown in FIG. 2, the at least one feed line segment includes the first feed line segment 203 and the second feed line segment 204. The first feed line segment 203 and the second feed line segment 204 are included. A first end of the first feed line segment 203 is connected to a first end of the second feed line segment 204. A second end of the first feed line segment 203 is connected to the first radiating element 202, and is configured to feed the first radiating element 202. The first end of the first feed line 203 in this embodiment is equivalent to the second end of the first feed line segment 203.

In this embodiment of this application, the microstrip antenna further includes: a first power splitter 205, a second radiating element 209, and a second feed line 207. The first end of the second feed line 207 is connected to the second radiating element 209, and is configured to feed the second radiating element 209. The first power splitter 202, the second radiating element 209, the second feed line 207, and the first radiating element 202 are arranged on a same surface of the dielectric substrate 201. A first end of the first power splitter 205 is separately connected to a second end of the first feed line and a second end of the second feed line 207, the second radiating element 209 and the first radiating element 202 are symmetrically arranged on the dielectric substrate 201 relative to the first power splitter 205, and the second feed line 207 and the first feed line are symmetrically arranged on the dielectric substrate 201 relative to the first power splitter 205.

In this embodiment of this application, the microstrip antenna further includes a second power splitter 209 and a third feed line (206, 208). The second power splitter 210, the third feed line (206, 208), and the first radiating element 202 are arranged on a same surface of the dielectric substrate 201. The second power splitter 210 on the dielectric substrate 201 and the first power splitter 205 are centrosymmetric relative to a center point of the second radiating element 209, and the other end of the first power splitter 205 is connected to an end of the second power splitter 210 through the third feed line (206, 208). The third feed line includes at least one third feed line segment, and an acute angle between each third feed line segment and the current direction of the first radiating element is greater than or equal to 20 degrees, and is less than or equal to 70 degrees. Optionally, a difference between a length of each third feed line segment and a preset wavelength is less than a preset value, and the preset wavelength is one half of the dielectric wavelength of the dielectric substrate. For example, the third feed line segment may be the feed line segment 206 and/or the feed line segment 208 shown in FIG. 2. According to the foregoing design, space occupation of an antenna array can be reduced, and space utilization of the antenna array is improved.

In this embodiment of this application, the first end of the first power splitter 205 and a second end of the second power splitter 210 are in a same direction, and a second end of the first power splitter 205 and a first end of the second power splitter 210 are in a same direction. According to the foregoing design, the antenna array may be further miniaturized.

In this embodiment of this application, an interval between the first radiating element 202 and the second radiating element 209 is greater than or equal to one half of the dielectric wavelength of the dielectric substrate, and is less than or equal to the dielectric wavelength of the dielectric substrate.

Optionally, in this embodiment of this application, an operating frequency of the antenna is greater than 60 GHZ. In a high-frequency scenario, because the dielectric substrate is relatively thick relative to the dielectric wavelength of the dielectric substrate, when a parallel-fed network and the radiating element are disposed at a same layer, greater impact is caused on a pattern of the radiating element. Optionally, in this embodiment of this application, a ratio of the dielectric wavelength to a thickness of the dielectric substrate is less than 20. In the high-frequency scenario, because the dielectric substrate is relatively thick relative to the dielectric wavelength of the dielectric substrate, when the parallel-fed network and the radiating element are disposed at the same layer, greater impact is caused on the pattern of the radiating element. When this embodiment is applied to the high-frequency scenario, impact caused by the parallel-fed network on the pattern of the radiating element can be greatly reduced.

Optionally, in this embodiment of this application, the interval between the first radiating element 202 and the second radiating element 209 is greater than or equal to one half of the dielectric wavelength of the dielectric substrate, and is less than or equal to the dielectric wavelength of the dielectric substrate.

Embodiments of this application provide an antenna, including a first radiating element and a first feed line. A first end of the first feed line is connected to the first radiating element. The first radiating element and the first feed line are arranged on a same surface of a dielectric substrate. The first feed line includes a first feed line segment, and an acute angle between the first feed line segment and a current direction of the first radiating element is greater than or equal to 20 degrees, and is less than or equal to 70 degrees. A feeding manner of the antenna is parallel feeding. In this application, when impact of the feed line on a pattern of the radiating element is reduced, a feed network and the radiating element are disposed at a same layer of the dielectric substrate. This reduces processing difficulty and costs of a microstrip antenna.

Figure 7:
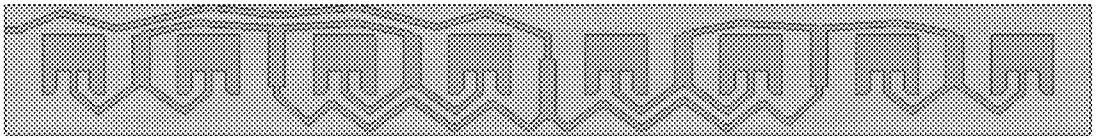
FIG. 7 is a schematic diagram of a structure of a microstrip antenna according to an embodiment of this application.

FIG. 7 is a schematic diagram of a structure of a microstrip antenna according to an embodiment of this application. Different from the microstrip antenna shown in FIG. 2, the microstrip antenna in FIG. 7 has different specifications, and is an antenna array including eight radiating elements. However, it is the same as FIG. 2, for each radiating element, a feed line directly connected to the radiating element or a feed line connected to a power splitter may include a feed line segment that forms an included angle with the radiating element. For details, refer to the microstrip antennas shown in FIG. 2 to FIG. 6 and the descriptions in the corresponding embodiments. Details are not described herein again. It should be noted that the microstrip antenna may further include 2N radiating elements. This is not limited in this application.

Figure 8:
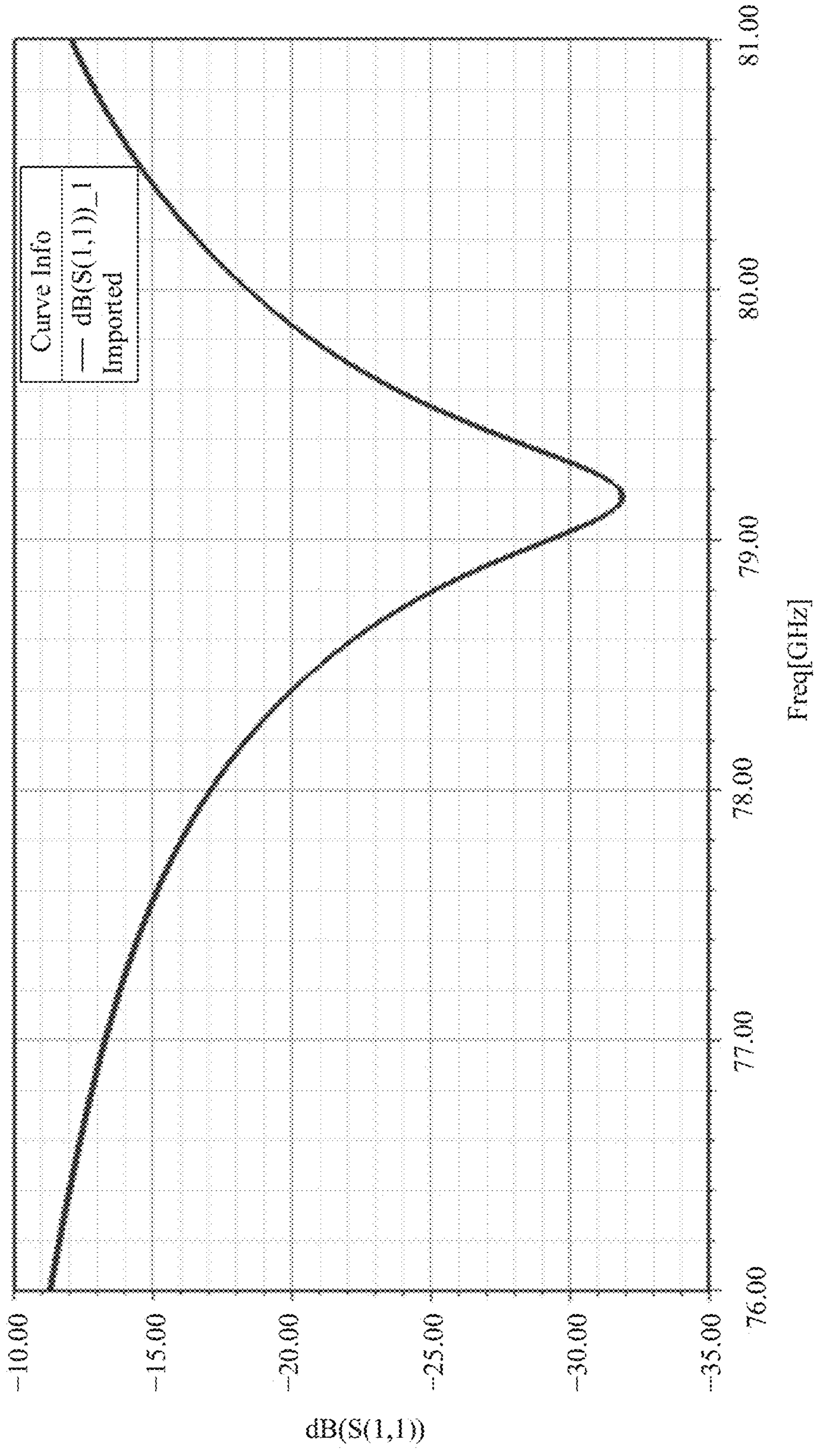
FIG. 8 is a schematic diagram of a simulation effect of a microstrip antenna according to an embodiment of this application.

FIG. 8 is a schematic diagram of a simulation effect of a microstrip antenna according to an embodiment of this application. As shown in FIG. 8, in a high frequency band (a frequency band between 76 GHz and 81 GHz), this application corresponds to a noise below −10 dB. Therefore, a feed line has little impact on a pattern of a radiating element.

Figure 9:
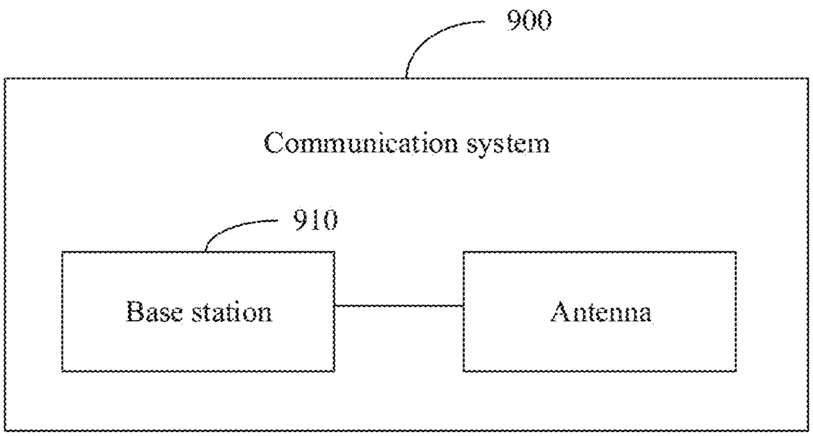
FIG. 9 is a schematic diagram of a structure of a communication system according to this application.

Refer to FIG. 9. An embodiment of this application further provides a communication system 900. The communication system 900 includes a base station 910 and an antenna. The base station 910 may receive and send a signal through the antenna. The antenna may be integrated into the base station 910, or may be separately disposed from the base station 910. The antenna may be the antenna shown in FIG. 2 to FIG. 7. Because the antenna has been described in detail in the foregoing embodiments, details are not described herein again.

The base station 910 may refer to a radio transceiver, such as a cellsite (cellsite) in a cellular network, a wireless access point (wireless access point, WAP) in a wireless local area network (wireless local area network, WLAN).

Embodiments of this application further provide a radar. The radar may be applied to a vehicle, and the radar may receive and send a signal through an antenna. The antenna may be integrated into the radar or may be separately disposed from the radar. The antenna may be the antenna shown in FIG. 2 to FIG. 7, Because the antenna has been described in detail in the foregoing embodiments, details are not described herein again.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, alternatively, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a thrill of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, all or some of the procedures or functions according to the embodiments of this application are generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid-state disk (solid-state disk, SSD)), or the like.

What is claimed is:

1. An antenna, comprising:

a first radiating element and a first feed line, wherein a first end of the first feed line is connected to the first radiating element;

the first radiating element and the first feed line are arranged on a same surface of a dielectric substrate;

the first feed line comprises a first feed line segment, and an acute angle between the first feed line segment and a current direction of the first radiating element is greater than or equal to 20 degrees, and is less than or equal to 70 degrees; and wherein a difference between a length of the first feed line segment and a preset wavelength is less than a preset value, and wherein the antenna is configured to generate an electromagnetic wave that travels through the dielectric substrate, and the preset wavelength is one half of a wavelength of the electromagnetic wave that travels through the dielectric substrate;

wherein the antenna comprises: a first power splitter, a second radiating element, and a second feed line, wherein the first end of the second feed line is connected to the second radiating element, and is configured to feed the second radiating element;

the first power splitter, the second radiating element, the second feed line, and the first radiating element are arranged on a same surface of the dielectric substrate; and a first end of the first power splitter is separately connected to a second end of the first feed line and a second end of the second feed line, the second radiating element and the first radiating element are symmetrically arranged on the dielectric substrate relative to the first power splitter, and the second feed line and the first feed line are symmetrically arranged on the dielectric substrate relative to the first power splitter; and wherein the antenna further comprises:

a second power splitter and a third feed line, wherein the second power splitter, the third feed line, and the first radiating element are arranged on a same surface of the dielectric substrate;

the second power splitter and the first power splitter are centrosymmetric on the dielectric substrate relative to a center point of the second radiating element, and a second end of the first power splitter is connected to an end of the second power splitter through the third feed line; and the third feed line comprises at least one third feed line segment, and an acute angle between each third feed line segment and the current direction of the first radiating element is greater than or equal to 20 degrees, and is less than or equal to 70 degrees.

2. The antenna according to claim 1, wherein the first feed line further comprises a second feed line segment; and a first end of the first feed line segment is connected to a first end of the second feed line segment, and an included angle between the first feed line segment and the second feed line segment is greater than or equal to 70 degrees, and is less than or equal to 135 degrees.

3. The antenna according to claim 2, wherein a second end of the first feed line segment is connected to the first radiating element.

4. The antenna according to claim 1, wherein a difference between a length of each third feed line segment and the preset wavelength is less than the preset value.

5. The antenna according to claim 1, wherein the first end of the first power splitter and a second end of the second power splitter are aligned in the same direction, and a second end of the first power splitter and a first end of the second power splitter are in a same direction.

6. The antenna according to claim 1, wherein an interval between the first radiating element and the second radiating element is greater than or equal to one half of the wavelength of the electromagnetic wave that travels through the dielectric substrate, and is less than or equal to the wavelength of the electromagnetic wave that travels through the dielectric substrate.

7. The antenna according to claim 1, wherein an operating frequency of the antenna is greater than 60 GHz.

8. The antenna according to claim 1, wherein a ratio of the wavelength of the electromagnetic wave that travels through the dielectric substrate to a thickness of the dielectric substrate is less than 20.

9. The antenna according to claim 1, wherein the antenna further comprises:

a reflection panel, wherein the reflection panel and the first feed line are disposed on opposite surfaces of the dielectric substrate.

10. A radar, comprising an antenna wherein the radar transmits and receives a signal through the antenna; wherein the antenna comprises:

a first radiating element and a first feed line, wherein a first end of the first feed line is connected to the first radiating element;

the first radiating element and the first feed line are arranged on a same surface of a dielectric substrate;

the first feed line comprises a first feed line segment, and an acute angle between the first feed line segment and a current direction of the first radiating element is greater than or equal to 20 degrees, and is less than or equal to 70 degrees; and wherein a difference between a length of the first feed line segment and a preset wavelength is less than a preset value, and wherein the antenna is configured to generate an electromagnetic wave that travels through the dielectric substrate, and the preset wavelength is one half of a wavelength of the electromagnetic wave that travels through the dielectric substrate;

wherein the antenna comprises: a first power splitter, a second radiating element, and a second feed line, wherein the first end of the second feed line is connected to the second radiating element, and is configured to feed the second radiating element;

the first power splitter, the second radiating element, the second feed line, and the first radiating element are arranged on a same surface of the dielectric substrate; and a first end of the first power splitter is separately connected to a second end of the first feed line and a second end of the second feed line, the second radiating element and the first radiating element are symmetrically arranged on the dielectric substrate relative to the first power splitter, and the second feed line and the first feed line are symmetrically arranged on the dielectric substrate relative to the first power splitter; and wherein the antenna further comprises:

a second power splitter and a third feed line, wherein the second power splitter, the third feed line, and the first radiating element are arranged on a same surface of the dielectric substrate;

the second power splitter and the first power splitter are centrosymmetric on the dielectric substrate relative to a center point of the second radiating element, and a second end of the first power splitter is connected to an end of the second power splitter through the third feed line; and the third feed line comprises at least one third feed line segment, and an acute angle between each third feed line segment and the current direction of the first radiating element is greater than or equal to 20 degrees, and is less than or equal to 70 degrees.

11. The radar according to claim 10, wherein the first feed line further comprises a second feed line segment; and a first end of the first feed line segment is connected to a first end of the second feed line segment, and an included angle between the first feed line segment and the second feed line segment is greater than or equal to 70 degrees, and is less than or equal to 135 degrees.

12. The radar according to claim 11, wherein a second end of the first feed line segment is connected to the first radiating element.

13. The radar according to claim 10, wherein the radar is a vehicle-mounted radar.

14. The radar according to claim 10, wherein an operating frequency of the antenna is greater than 60 GHz.

15. The radar according to claim 10, wherein a ratio of the wavelength of the electromagnetic wave that travels through the dielectric substrate to a thickness of the dielectric substrate is less than 20.

16. The radar according to claim 10, wherein a difference between a length of each third feed line segment and the preset wavelength is less than the preset value.

17. The radar according to claim 10, wherein the first end of the first power splitter and a second end of the second power splitter are aligned in the same direction, and a second end of the first power splitter and a first end of the second power splitter are in a same direction.

18. The radar according to claim 10, wherein an interval between the first radiating element and the second radiating element is greater than or equal to one half of the wavelength of the electromagnetic wave that travels through the dielectric substrate, and is less than or equal to the wavelength of the electromagnetic wave that travels through the dielectric substrate.

19. The radar according to claim 10, wherein the antenna further comprises:

a reflection panel, wherein the reflection panel and the first feed line are disposed on opposite surfaces of the dielectric substrate.

* * * * *